US012160289B2

(12) United States Patent
Jeon et al.

(10) Patent No.: US 12,160,289 B2
(45) Date of Patent: Dec. 3, 2024

(54) FREQUENCY CONVERSION BEAM SQUINT CORRECTION METHOD OF ACTIVE PHASE ARRAY ANTENNA SYSTEM

(71) Applicant: RFCORE CO., LTD., Gyeonggi-do (KR)

(72) Inventors: Kye-Ik Jeon, Gyeonggi-do (KR); Tong-Ook Kong, Gyeonggi-do (KR)

(73) Assignee: RFCORE CO., LTD., Gyeonggi-do (KR)

( * ) Notice: Subject to any disclaimer, the term of this patent is extended or adjusted under 35 U.S.C. 154(b) by 98 days.

(21) Appl. No.: 17/946,422

(22) Filed: Sep. 16, 2022

(65) Prior Publication Data
US 2023/0336217 A1  Oct. 19, 2023

(30) Foreign Application Priority Data
Apr. 13, 2022 (KR) .................. 10-2022-0045613

(51) Int. Cl.
*H04B 7/0426* (2017.01)
*G01S 13/44* (2006.01)
*G01S 13/90* (2006.01)
*H04B 7/204* (2006.01)

(52) U.S. Cl.
CPC .......... *H04B 7/043* (2013.01); *G01S 13/4445* (2013.01); *G01S 13/904* (2019.05); *H04B 7/2043* (2013.01)

(58) Field of Classification Search
CPC .... H01Q 3/2682; H01Q 3/2694; H04B 7/043; H04B 7/2043; H04B 7/0617; H04B 7/0667; H04B 7/0671; G01S 13/904; G01S 13/4445
See application file for complete search history.

(56) References Cited

U.S. PATENT DOCUMENTS

| 11,408,994 B2* | 8/2022 | Roemer ................. G01S 13/90 |
| 11,677,145 B1* | 6/2023 | Sharma ................ H01Q 3/2682 |
| | | 342/372 |
| 2017/0163328 A1* | 6/2017 | Tiebout ................ H04B 7/0408 |
| 2021/0385561 A1* | 12/2021 | Kwon .............. H04B 10/25752 |

FOREIGN PATENT DOCUMENTS

KR    20170108365    9/2017

OTHER PUBLICATIONS

Longfei Yan et al., "Energy-efficient Dynamic-subarray with Fixed True-time-delay Design for Terahertz Wideband Hybrid Beamforming", Feb. 7, 2022, arXiv:2202.02965v1, pp. 1-33 (Year: 2022).*
Feifei Gao et al. "Wideband Beamforming for Hybrid Massive MIMO Terahertz Communications", Jun. 2021, IEEE Journal On Selected Areas in Communications, vol. 39, No. 6, Jun. 2021, pp. 1725-1740. (Year: 2021).*

* cited by examiner

*Primary Examiner* — Sophia Vlahos
(74) *Attorney, Agent, or Firm* — IPLA P.A.

(57) ABSTRACT

A frequency conversion beam squint correction method of an active phase array antenna system including a plurality (m) of beamforming units configured of an antenna, a first amplifier, a phase shifter, a variable attenuator, and a second amplifier, the method includes the steps of: adjusting a delay time of an applied RF signal by arranging m/2 true time delays (TTDs) for every two adjacent beamforming units; and converting the frequency of the RF signal by mixing the RF signal transferred to each of the m/2 true time delays and a local oscillation signal using a mixer.

4 Claims, 3 Drawing Sheets

(each "TD" in the drawing stands for "true time delays" or "TTDs")

(each "TD" in the drawing stands for "true time delays" or "TTDs")

(each "TD" in the drawing stands for "true time delays" or "TTDs")

(each "TD" in the drawing stands for "true time delays" or "TTDs")

FREQUENCY CONVERSION BEAM SQUINT CORRECTION METHOD OF ACTIVE PHASE ARRAY ANTENNA SYSTEM

CROSS REFERENCE

This application claims the benefit of Korean Patent Application No. 10-2022-0045613 filed in the Korean Intellectual Property Office on 13 Apr. 2022, the entire contents of which are incorporated herein by reference.

BACKGROUND

The present invention relates to a frequency conversion beam squint correction method of an active phase array antenna system, and more particularly, to a frequency conversion beam squint correction method of an active phase array antenna system, which can effectively suppress beam squint at a frequency other than the frequency of an RF signal, at which a beam steering direction is set, by adjusting the delay time of the RF signal by arranging a true time delay in each of a plurality of phase shifters, and adjust the operating frequency of the true time delay by employing a mixer.

In an antenna system employing a plurality of phase array antennas, a phase needed for beam steering is set by arranging a phase shifter in each of the plurality of phase array antennas.

However, when the antenna system employing the phase array antenna using a phase shifter described above is driven in a frequency band of wide instantaneous bandwidth like in a millimeter wave 5G communication, a problem of seriously shifting the beam of an RF signal steered may occur at a frequency other than the frequency at which the beam steering is set. For example, the instantaneous bandwidth reaches as high as 800 MHz on the basis of a 28 GHz signal in some millimeter wave 5G communication methods. That is, a 5G communication method with a center frequency of 28 GHz may operate at a frequency of 27.6 to 28.4 GHz. In this case, when the beam is set to be steered in a specific direction at 28 GHz, a beam squint phenomenon occurs at 27.6 or 28.4 GHz, and the beam is steered in a direction other than the set direction.

The background of the present invention is disclosed in Korean Patent Publication No. 10-2017-0108365.

SUMMARY OF THE INVENTION

Therefore, the present invention has been made in view of the above problems, and it is an object of the present invention to provide a frequency conversion beam squint correction method of an active phase array antenna system, which can effectively suppress beam squint at a frequency other than the frequency of an RF signal, at which a beam steering direction is set, by adjusting the delay time of the RF signal by arranging a true time delay in each of a plurality of phase shifters.

Another object of the present invention is to provide a frequency conversion beam squint correction method of an active phase array antenna system, which can adjust the operating frequency of the true time delay by employing a mixer.

The technical problems to be solved by the present invention are not limited to the technical problems mentioned above, and unmentioned other technical problems will be clearly understood by those skilled in the art from the following description.

To accomplish the above object, according to a first embodiment of the present invention, there is provided a frequency conversion beam squint correction method of an active phase array antenna system including a plurality (m) of beamforming units configured of an antenna, a first amplifier, a phase shifter, a variable attenuator, and a second amplifier, the method comprising the steps of: adjusting a delay time of an applied RF signal by arranging m/2 true time delays (TTDs) for every two adjacent beamforming units; and converting an operating frequency signal of the m/2 true time delays into an RF signal using a local signal and a mixer.

According to a second embodiment of the present invention, there is provided a frequency conversion beam squint correction method of an active phase array antenna system including a plurality (n) of beamforming units configured of an antenna, a first amplifier, a phase shifter, a variable attenuator, and a second amplifier, the method comprising the steps of: adjusting a delay time of an applied RF signal by arranging n/2 first true time delays (TTDs) for every two adjacent beamforming units; adjusting a delay time of an applied RF signal by arranging n/4 second true time delays (TTDs) for every two adjacent first true time delays (TTDs); and converting an operating frequency signal of the n/2 first true time delays and the n/4 second true time delays into an RF signal using a local signal and a mixer.

According to a third embodiment of the present invention, there is provided a frequency conversion beam squint correction method of an active phase array antenna system including a plurality (p) of beamforming units configured of an antenna, a first amplifier, a phase shifter, a variable attenuator, and a second amplifier, the method comprising the steps of: adjusting a delay time of an applied RF signal by arranging p/x true time delays (TTDs) for every x adjacent beamforming units; and converting an operating frequency signal of the p/x true time delays into an RF signal using a local signal and a mixer.

According to a fourth embodiment of the present invention, there is provided a frequency conversion beam squint correction method of an active phase array antenna system including a plurality (q) of beamforming units configured of an antenna, a first amplifier, a phase shifter, a variable attenuator, and a second amplifier, the method comprising the steps of: adjusting a delay time of an applied RF signal by arranging q/w first true time delays (TTDs) for every w adjacent beamforming units; adjusting a delay time of an applied RF signal by arranging q/(w*y) second true time delays (TTDs) for every y adjacent first true time delays (TTDs); and converting an operating frequency signal of the q/w first true time delays and the q/(w*y) second true time delays into an RF signal using a local signal and a mixer.

DETAILED DESCRIPTION OF THE PREFERRED EMBODIMENT

Figure 1:
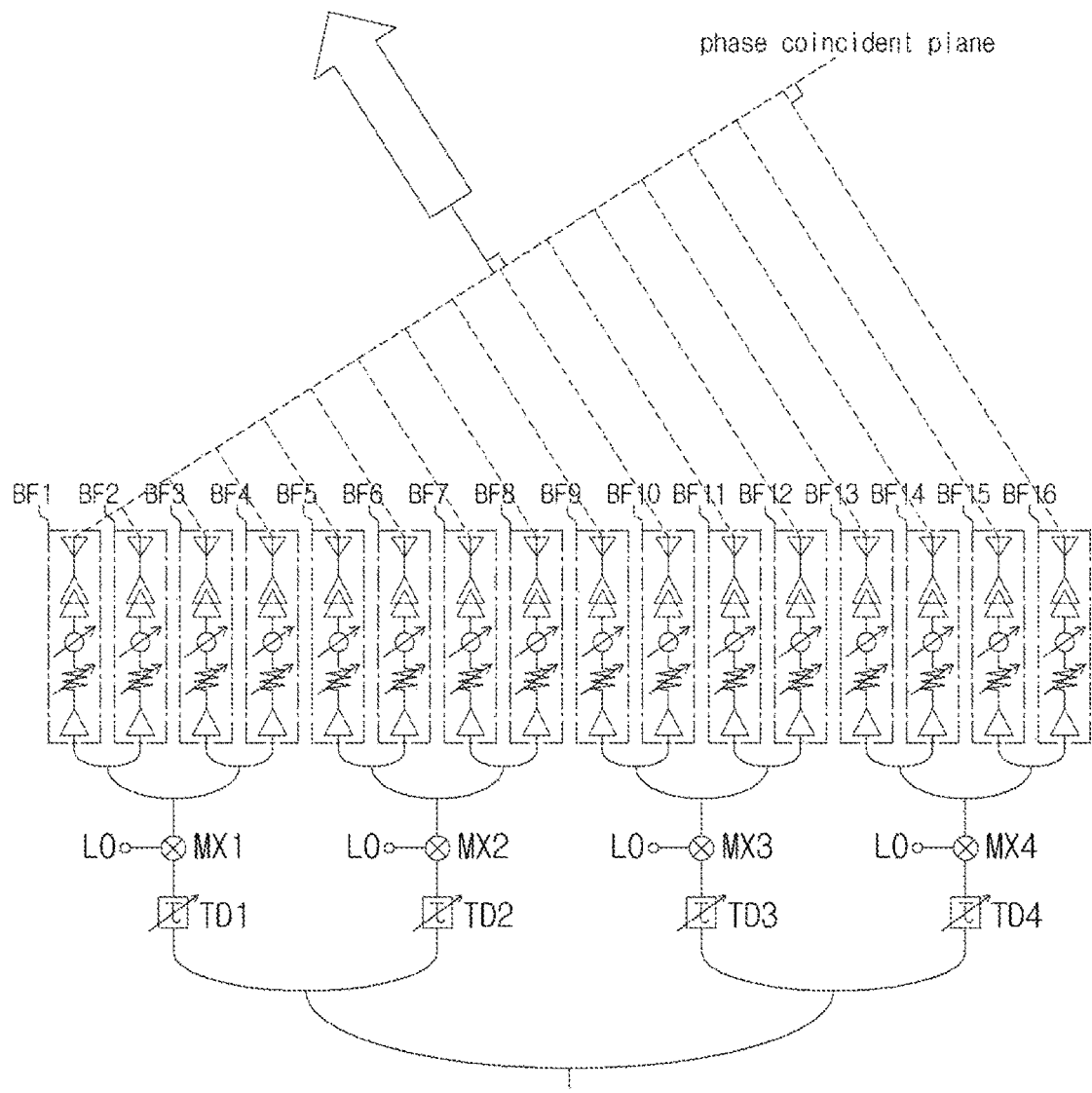
FIG. 1 is a circuit diagram showing an active phase array antenna system to which a frequency conversion beam squint correction method of an active phase array antenna system is applied according to the present invention.

The detailed description of the present invention described below will make a reference to the accompanying drawings that show specific embodiments in which the present invention can be practiced. These embodiments are described in sufficient detail so that those skilled in the art may practice the present invention. It should be understood that although various embodiments of the present invention are different from each other, they do not need to be mutually exclusive.

For example, specific shapes, structures, and characteristics described herein may be implemented in other embodiments without departing from the spirit and scope of the invention in relation to an embodiment. In addition, it should be understood that the location or arrangement of individual components within each disclosed embodiment may be changed without departing from the spirit and scope of the present invention.

Accordingly, the detailed description described below is not intended to be taken in a limiting sense, and if properly described, the scope of the present invention is limited only by the appended claims, together with all the scopes equivalent to those in the claims.

In the drawings, like reference numerals refer to like or similar functions in various aspects, and the length, area, thickness, and the like may be exaggerated for convenience.

As shown in FIG. 1, an active phase array antenna system to which a frequency conversion beam squint correction method of an active phase array antenna system is applied according to a first embodiment of the present invention includes a plurality of beamforming units BF1 to BF16 configured of an antenna, a first amplifier, a phase shifter, a variable attenuator, and a second amplifier. Here, when the active phase array antenna system is employed at the transmitting end, a power amplifier is configured as the first amplifier, and a gain block amplifier is configured as the second amplifier, and when the active phase array antenna system is employed at the receiving end, the direction of the amplifier is reversed, and a low noise amplifier is configured as the first amplifier, and a gain block amplifier is configured as the second amplifier.

When sixteen (m) beamforming units BF1 to BF16 are configured, the frequency conversion beam squint correction method of an active phase array antenna system according to a first embodiment of the present invention adjusts the delay time of an applied RF signal by arranging eight true time delays (TTDs) for every two adjacent beamforming units BF1 to BF16.

Figure 3:
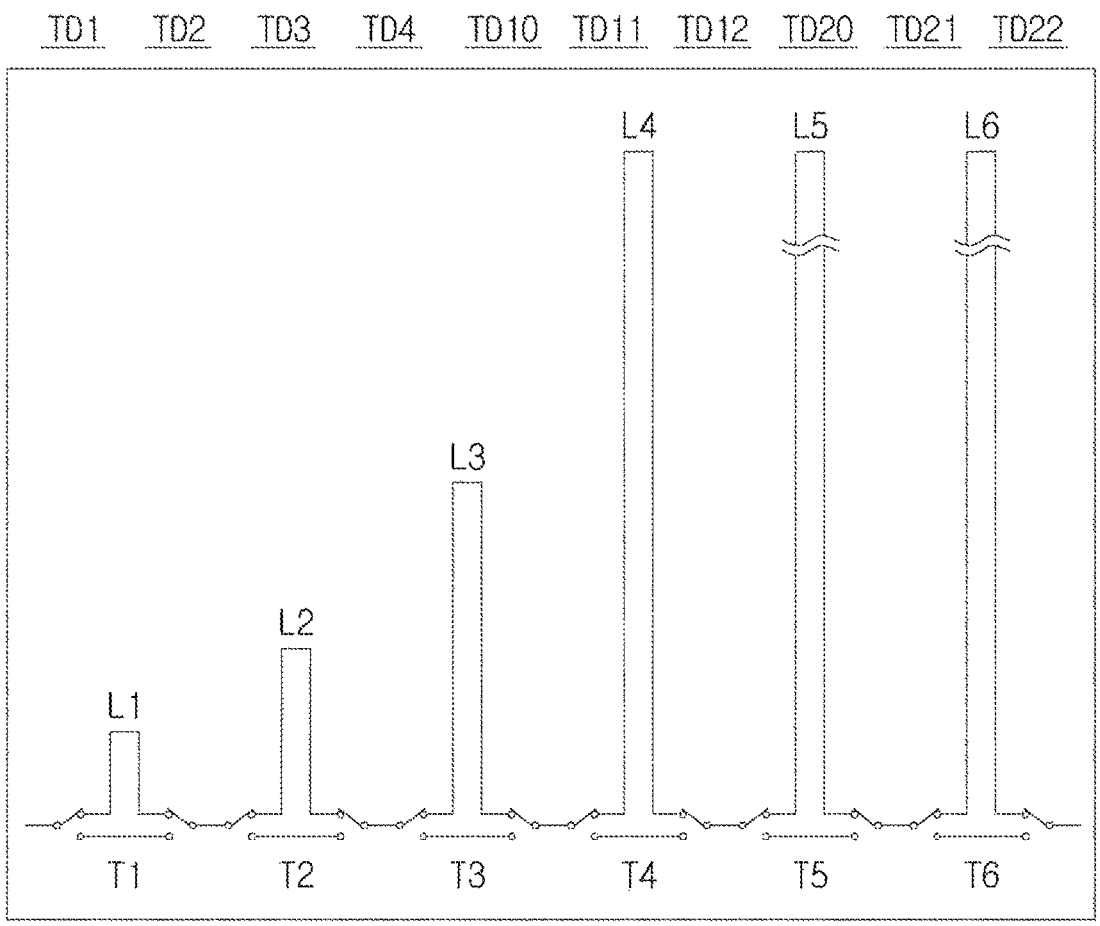
FIG. 3 is a detailed circuit diagram showing a true time delay employed in the active phase array antenna systems of FIGS. 1 and 2.

Meanwhile, as shown in FIG. 3, each true time delay is configured of a first delay path L1, a second delay path L2, a third delay path L3, a fourth delay path L4, a fifth delay path L5, and a sixth delay path L6. Here, the length of the second delay path L2 is two times as long as the length of the first delay path L1, the length of the third delay path L3 is four times as long as the length of the first delay path L1, the length of the fourth delay path L4 is eight times as long as the length of the first delay path L1, the length of the fifth delay path L5 is sixteen times as long as the length of the first delay path L1, and the length of the sixth delay path L6 is thirty-two times as long as the length of the first delay path L1.

Specifically, when a first delay time T1 is 1 ps, a second delay time T2 is 2 ps, a third delay time T3 is 4 ps, a fourth delay time T4 is 8 ps, a fifth delay time T5 is 16 ps, and a sixth delay time T6 is 32 ps, and therefore, the delay time is adjusted in a range of 0 to 63 ps.

In addition, the frequency conversion beam squint correction method of an active phase array antenna system according to a first embodiment of the present invention converts the operating frequency signal of the true time delay into the RF signal by mixing a local signal and a mixer (MX1, MX2, MX3, MX4).

Here, when the operating frequency of the true time delay is different from the operating frequency of the active phase array antenna system (the frequency of the RF signal), the operating frequency of the true time delay may be converted into the frequency of the RF signal in the method described above using the mixer (MX1, MX2, MX3, MX4), and therefore, true time delays of various forms or various frequencies can be employed.

The frequency conversion beam squint correction method of an active phase array antenna system according to a first embodiment of the present invention may adjust the phase of an applied RF signal by adjusting the delay time of the applied RF signal by arranging each of eight (m/2) true time delays for every two adjacent beamforming units BF1 to BF16, and adjust the phase of the applied RF signal using the phase shifter configured for each of the beamforming units BF1 to BF16.

Accordingly, the frequency conversion beam squint correction method of an active phase array antenna system according to a first embodiment of the present invention may effectively suppress the beam squint at a frequency other than the frequency of the RF signal, at which the beam steering direction is set, by primarily adjusting the phase of the applied RF signal using a true time delay, and secondarily adjusting the phase of the applied RF signal using the phase shifter configured for each of the beamforming units BF1 to BF16.

Figure 2:
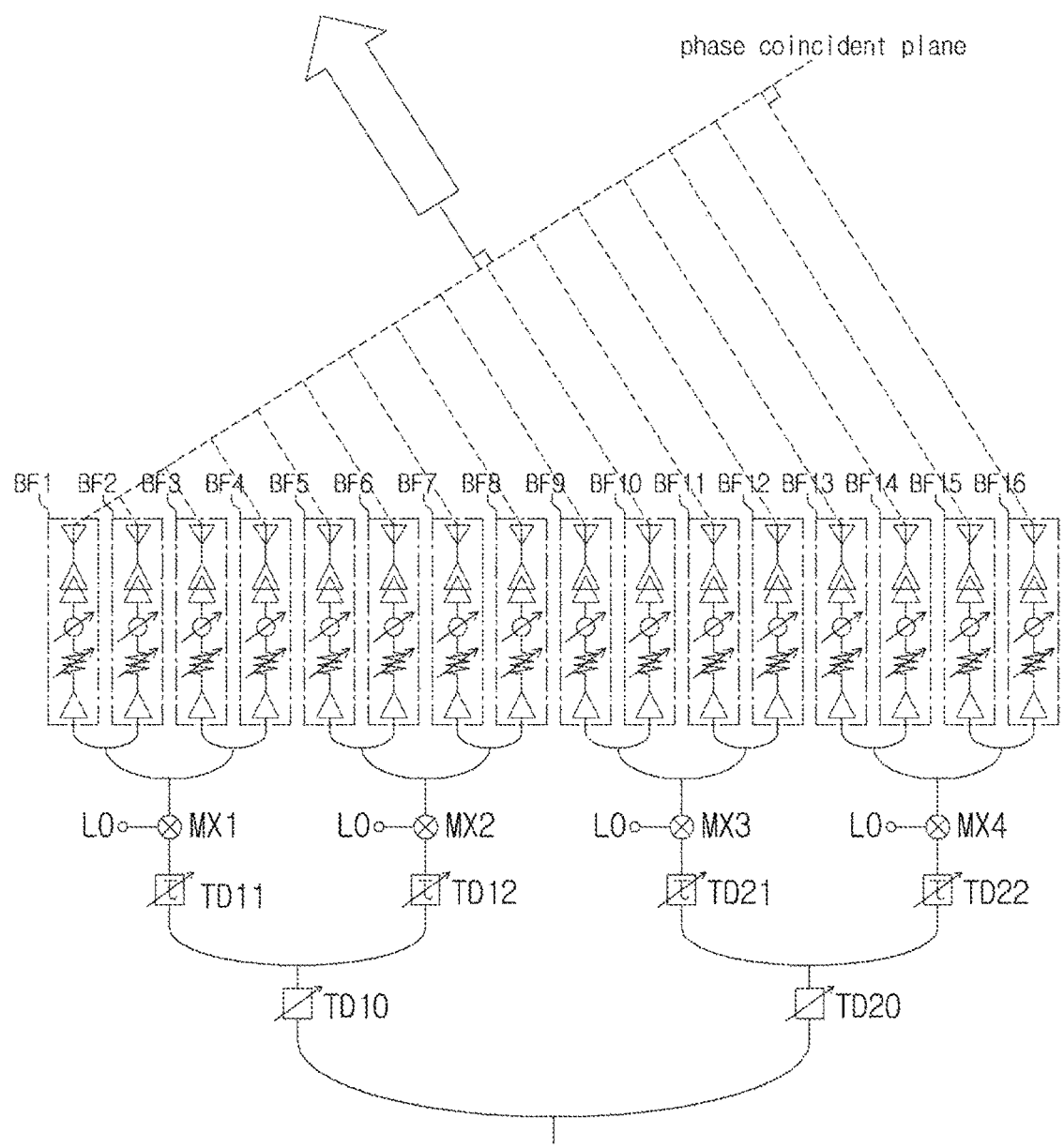
FIG. 2 is a circuit diagram showing an active phase array antenna system to which a frequency conversion beam squint correction method of an active phase array antenna system is applied according to the present invention.

As shown in FIG. 2, an active phase array antenna system to which a frequency conversion beam squint correction method of an active phase array antenna system is applied according to a second embodiment of the present invention includes a plurality of beamforming units BF1 to BF16 configured of an antenna, a first amplifier, a phase shifter, a variable attenuator, and a second amplifier. Here, when the active phase array antenna system is employed at the transmitting end, a power amplifier is configured as the first amplifier, and a gain block amplifier is configured as the second amplifier, and when the active phase array antenna system is employed at the receiving end, the direction of the amplifier is reversed, and a low noise amplifier is configured as the first amplifier, and a gain block amplifier is configured as the second amplifier.

When sixteen (n) beamforming units BF1 to BF16 are configured, the frequency conversion beam squint correction method of an active phase array antenna system according to a second embodiment of the present invention adjusts the delay time of an applied RF signal by arranging eight (TD11, TD12, TD21, TD22) first true time delays (TTDs) for every two adjacent beamforming units BF1 to BF16, and adjusts the delay time of an applied RF signal by arranging four (TD10, TD20) second true time delays (TTDs) for every two adjacent first true time delays.

Meanwhile, as shown in FIG. 3, each of the first true time delays (TD11, TD12, TD21, TD22) and the second true time delays (TD10, TD20) is configured of a first delay path L1, a second delay path L2, a third delay path L3, a fourth delay path L4, a fifth delay path L5, and a sixth delay path L6. Here, the length of the second delay path L2 is two times as long as the length of the first delay path L1, the length of the third delay path L3 is four times as long as the length of the first delay path L1, the length of the fourth delay path L4 is eight times as long as the length of the first delay path L1, the length of the fifth delay path L5 is sixteen times as long as the length of the first delay path L1, and the length of the sixth delay path L6 is thirty-two times as long as the length of the first delay path L1.

Specifically, when a first delay time T1 is 1 ps, a second delay time T2 is 2 ps, a third delay time T3 is 4 ps, a fourth delay time T4 is 8 ps, a fifth delay time T5 is 16 ps, and a sixth delay time T6 is 32 ps, and therefore, the delay time is adjusted in a range of 0 to 63 ps.

In addition, the frequency conversion beam squint correction method of an active phase array antenna system according to a first embodiment of the present invention converts the operating frequency signal of the first true time delay (TD11, TD12, TD21, TD22) and the second true time delay (TD10, TD20) into the RF signal by mixing a local signal and a mixer (MX1, MX2, MX3, MX4).

Here, when the operating frequencies of the first true time delay and the second true time delay are different from the operating frequency of the active phase array antenna system (the frequency of the RF signal), the operating frequencies of the first true time delay and the second true time delay may be converted into the frequency of the RF signal in the method described above using the mixer (MX1, MX2, MX3, MX4), therefore, true time delays of various forms or various frequencies can be employed.

The frequency conversion beam squint correction method of an active phase array antenna system according to a second embodiment of the present invention may adjust the phase of an applied RF signal by adjusting the delay time of the applied RF signal applied to two adjacent beamforming units BF1 to BF16 by arranging eight (n/2) first true time delays (TD11, TD12, TD21, TD22) and four (n/4) second true time delays (TD10, TD20) in a cascade method, and adjust the phase of the applied RF signal using the phase shifter configured for each of the beamforming units BF1 to BF16.

Accordingly, the frequency conversion beam squint correction method of an active phase array antenna system according to a second embodiment of the present invention may effectively suppress the beam squint at a frequency other than the frequency of the RF signal, at which the beam steering direction is set, by primarily adjusting the phase of the applied RF signal using the first true time delays (TD11, TD12, TD21, TD22) and the second true time delays (TD10, TD20), and secondarily adjusting the phase of the applied RF signal using the phase shifter configured for each of the beamforming units BF1 to BF16.

Only the difference between a frequency conversion beam squint correction method of an active phase array antenna system according to a third embodiment of the present invention and the frequency conversion beam squint correction method of the active phase array antenna system according to a first embodiment of the present invention will be described.

When 1024 (p) beamforming units BF1 to BF16 are configured, the frequency conversion beam squint correction method of an active phase array antenna system according to a third embodiment of the present invention adjusts the delay time of an applied RF signal by arranging four (p/x) true time delays (TTDs) for every 256 (x) adjacent beamforming units BF1 to BF16.

The frequency conversion beam squint correction method of an active phase array antenna system according to a third embodiment of the present invention may adjust the phase of an applied RF signal by adjusting the delay time of the applied RF signal by arranging each of four (p/x) true time delays (TD1, TD2, TD3, TD4) for every 256 (x) adjacent beamforming units BF1 to BF16, and adjust the phase of the applied RF signal using the phase shifter configured for each of 1024 (n) beamforming units BF1 to BF16.

Only the difference between a frequency conversion beam squint correction method of an active phase array antenna system according to a fourth embodiment of the present invention and the frequency conversion beam squint correction method of the active phase array antenna system according to a second embodiment of the present invention will be described.

When 1024 (q) beamforming units BF1 to BF16 are configured, the frequency conversion beam squint correction method of an active phase array antenna system according to a fourth embodiment of the present invention adjusts the delay time of an applied RF signal by arranging four (q/w) first true time delays (TD11, TD12, TD21, TD22) for every 256 (w) adjacent beamforming units BF1 to BF16, and adjusts the delay time of an applied RF signal by arranging two (q/(w*y)) second true time delays (TD10, TD20) for every two (y) adjacent first true time delays.

The frequency conversion beam squint correction method of an active phase array antenna system according to a fourth embodiment of the present invention may adjust the phase of an applied RF signal by adjusting the delay time of the applied RF signal applied to 256 (w) adjacent beamforming units BF1 to BF16 by arranging four (q/w) first true time delays (TD11, TD12, TD21, TD22) and two (q/(w*y)) second true time delays (TD10, TD20) in a cascade method, and adjust the phase of the applied RF signal using the phase shifter configured for each of 1024 (q) beamforming units BF1 to BF16.

The frequency conversion beam squint correction method of an active phase array antenna system according to the embodiments of the present invention may effectively suppress beam squint at a frequency other than the frequency of an RF signal, at which a beam steering direction is set, by adjusting the delay time of the RF signal by arranging a true time delay in each of a plurality of phase shifters.

In addition, the frequency conversion beam squint correction method of an active phase array antenna system according to the embodiments of the present invention may adjust the operating frequency of the true time delay by employing a mixer.

Although the present invention has been described and illustrated in connection with a preferred embodiment for illustrating the principles of the present invention, the present invention is not limited to the configuration and operation as shown and described above.

Rather, those skilled in the art will understand that many changes and modifications can be made to the present invention without departing from the spirit and scope of the appended claims.

Accordingly, all suitable changes and modifications and equivalents thereof should be considered as falling within the scope of the present invention.

DESCRIPTION OF REFERENCE NUMERALS

BF1 to BF16: Beamforming unit
L1: First delay path
L2: Second delay path
L3: Third delay path
L4: Fourth delay path
L5: Fifth delay path L6: Sixth delay path
T1: First delay time
T2: Second delay time
T3: Third delay time
T4: Fourth delay time
T5: Fifth delay time
T6: Sixth delay time
TD11, TD12, TD21, TD22: First true time delay
TD10, TD20: Second true time delay

What is claimed is:

1. A frequency conversion beam squint correction method of an active phase array antenna system including a plurality (m) of beamforming units, each beamforming usit configured of an antenna, a first amplifier, a phase shifter, a variable attenuator, and a second amplifier, the method comprising the steps of:
   adjusting a delay time of an applied radio frequency (RF) signal by arranging m/2 true time delays (TTDs) for every two adjacent beamforming units; and
   converting an operating frequency signal out of the m/2 true time delays into an RF signal using a local signal and a mixer.

2. A frequency conversion beam squint correction method of an active phase array antenna system including a plurality (n) of beamforming units, each beamforming unit configured of an antenna, a first amplifier, a phase shifter, a variable attenuator, and a second amplifier, the method comprising the steps of:
   adjusting a delay time of an applied radio frequency (RF) signal by arranging n/2 first true time delays (TTDs) for every two adjacent beamforming units;
   adjusting a delay time of an applied RF signal by arranging n/4 second true time delays (TTDs) for every two adjacent first true time delays (TTDs); and
   converting an operating frequency signal out of the n/2 first true time delays and out of the n/4 second true time delays into an RF signal using a local signal and a mixer.

3. A frequency conversion beam squint correction method of an active phase array antenna system including a plurality (p) of beamforming units, each beamforming unit configured of an antenna, a first amplifier, a phase shifter, a variable attenuator, and a second amplifier, the method comprising the steps of:
   adjusting a delay time of an applied radio frequency (RF) signal by arranging p/x true time delays (TTDs) for every x adjacent beamforming units; and
   converting an operating frequency signal out of the p/x true time delays into an RF signal using a local signal and a mixer.

4. A frequency conversion beam squint correction method of an active phase array antenna system including a plurality (q) of beamforming units, each beamforming unit configured of an antenna, a first amplifier, a phase shifter, a variable attenuator, and a second amplifier, the method comprising the steps of:
   adjusting a delay time of an applied radio frequency (RF) signal by arranging q/w first true time delays (TTDs) for every w adjacent beamforming units;
   adjusting a delay time of an applied RF signal by arranging q/(w*y) second true time delays (TTDs) for every y adjacent first true time delays (TTDs); and
   converting an operating frequency signal out of the q/w first true time delays and out of the q/(w*y) second true time delays into an RF signal using a local signal and a mixer.

* * * * *